US010609038B2

United States Patent
Hecht

(10) Patent No.: US 10,609,038 B2
(45) Date of Patent: Mar. 31, 2020

(54) DISCOVERING AND EVALUATING PRIVILEGED ENTITIES IN A NETWORK ENVIRONMENT

(71) Applicant: CyberArk Software Ltd., Petach-Tikva (IL)

(72) Inventor: Asaf Hecht, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 290 days.

(21) Appl. No.: 15/900,625

(22) Filed: Feb. 20, 2018

(65) Prior Publication Data

US 2019/0260754 A1 Aug. 22, 2019

(51) Int. Cl.
*H04L 29/06* (2006.01)
*H04L 29/08* (2006.01)
*H04L 12/24* (2006.01)

(52) U.S. Cl.
CPC ............ *H04L 63/102* (2013.01); *H04L 41/12* (2013.01); *H04L 63/08* (2013.01); *H04L 63/104* (2013.01); *H04L 63/1441* (2013.01); *H04L 67/10* (2013.01)

(58) Field of Classification Search
CPC .................................................. H04L 63/102
See application file for complete search history.

(56) References Cited

U.S. PATENT DOCUMENTS

| 7,423,213 B2 * | 9/2008 | Sitrick | G09B 15/023 84/470 R |
| 10,191,778 B1 * | 1/2019 | Yang | G06F 9/45558 |
| 2011/0191417 A1 * | 8/2011 | Rathod | G06F 16/58 709/204 |
| 2016/0330219 A1 * | 11/2016 | Hasan | H04L 63/1408 |
| 2017/0235848 A1 * | 8/2017 | Van Dusen | G06Q 50/01 705/12 |
| 2018/0098728 A1 * | 4/2018 | Cales | G16H 50/30 |
| 2019/0138727 A1 * | 5/2019 | Dontov | H04W 12/009 |
| 2019/0318122 A1 * | 10/2019 | Hockey | G06F 21/6245 |

* cited by examiner

*Primary Examiner* — Simon P Kanaan
(74) *Attorney, Agent, or Firm* — Finnegan, Henderson, Farabow, Garrett & Dunner, LLP

(57) ABSTRACT

Systems and methods are provided for automatically discovering and evaluating privileged entities in a network environment. The systems and methods can include scanning the network environment to identify a plurality of network entities. This scan can include identifying network permissions corresponding to the plurality of network entities. The operations can further include performing a multi-layer evaluation of the permissions corresponding to the plurality of network entities, the multi-layer evaluation being based at least on factors of network action sensitivity and network resource sensitivity. The network action sensitivity factor can address the sensitivity of particular actions that the plurality of network entities are able to take in the network environment. The network resource sensitivity factor can address the sensitivity of particular resources in the network environment that the plurality of network entities are able to access. The system and methods can identify privileged entities using this multi-layer evaluation.

26 Claims, 4 Drawing Sheets

DISCOVERING AND EVALUATING PRIVILEGED ENTITIES IN A NETWORK ENVIRONMENT

BACKGROUND

Cloud computing technologies are broadly applicable in many technological fields. As a result, many organizations worldwide are using cloud technologies, such as AMAZON WEB SERVICES, MICROSOFT AZURE, and others. Rely on a cloud computing implementation of an application architecture can reduce development times and development costs, while increasing the flexibility and scalability of applications. But cloud computing implementations add a new layer of security risks. A cloud-based infrastructure can be made up of many individual roles, users, services, machines, and other entities. Some privileged entities will be capable of making substantial changes to the cloud infrastructure, for example accessing sensitive protected data. These privileged entities must be secured, for example by tracking the activities of these entities and rotating credentials for them.

Current approaches define entities associated with certain permissions as privileged. But these entities are only a subset of all of the privileged entities in a cloud deployment. Other entities can be privileged because they control attributes of other, privileged entities. These "shadow" privileged entities can be extremely difficult to identify, as cloud environments can be built using many different permissions. A "shadow" entity can be privileged because of a combination of the privileges assigned to the entity and the availability of other entities deployed to the network environment. Furthermore, the status of an entity as non-privileged or privileged can change over time, as the privileges and entities making up a cloud deployment evolve. A secure cloud environment should manage these "shadow" privileged entities, just as it manages more conventionally privileged entities.

Consequently, systems and methods are required for automatically evaluating and ranking entities deployed to a network environment. Such systems and methods can enable automatic determination of the most privileged entities in the network environment. These entities can then be targeted for additional management and protection.

SUMMARY

It is to be understood that both the foregoing general description and the following detailed description are exemplary and explanatory only and are not restrictive of the disclosed embodiments, as claimed.

The disclosed embodiments include a non-transitory computer readable medium including instructions. When executed by at least one processor, the instructions can cause the at least one processor to perform operations for automatically discovering and evaluating privileged entities in a network environment. The operations can include scanning the network environment to identify a plurality of network entities. This scan can further identify network permissions corresponding to the plurality of network entities. The operations can include performing a multi-layer evaluation of the permissions corresponding to the plurality of network entities. This multi-layer evaluation can be based at least on factors of network action sensitivity and network resource sensitivity. The network action sensitivity factor can address the sensitivity of particular actions that the plurality of network entities are able to take in the network environment. The network resource sensitivity factor can address the sensitivity of particular resources in the network environment that the plurality of network entities are able to access. The operations can include identifying a first subset of the plurality of network entities based on the multi-layer evaluation. The operations can also include identifying a second subset of the plurality of network entities having permissions enabling them to control attributes of the first subset of the plurality of network entities. The operations can also include performing, based on the identifications of the first and second subsets of the plurality of network entities, at least one of: present at least the second subset of the plurality of network entities according to a numerical rank that corresponds to the multi-layer evaluation; output a report identifying at least the second subset of the plurality of network entities; and provide the identities of at least the second subset of the plurality of network entities to another system for purposes of taking actions on their permissions.

In some embodiments, the first and second subsets of the plurality of network entities may include at least some common network entities. In various embodiments, the first and second subsets of the plurality of network entities may not include any common network entities. The multi-layer evaluation can an iterative process in some embodiments. In some aspects, this iterative process can include an operation to identify a third set of network entities having permissions enabling them to control attributes of the second subset of the plurality of network entities. In various aspects, the third set of network entities can include network entities that were not identified in the scan of the network.

In some embodiments, the factors on which the multi-layer evaluation can be based are dynamically changing. In various embodiments, the scan of the network environment can be based on a query to an application programming interface associated with a cloud network provider. In some embodiments, the scan of the network environment can be based on a query to a directory service associated with the network environment. In various embodiments, the operations can further comprise determining whether any of the plurality of network entities have permissions matching a predefined set of known permissions.

In some embodiments, the multi-layer evaluation can be based on abilities of the plurality of network entities to access or control specific application programming interfaces in the network environment. In various embodiments, the network resource sensitivity factor can be further based on numbers of network resources that the plurality of network entities are able to access or control. In some embodiments, the network action sensitivity factor can be further based on abilities of the plurality of network entities to escalate their own permissions. In various embodiments, the network action sensitivity factor can be further based on abilities of the plurality of network entities to modify permissions of other network entities. In some embodiments, the network action sensitivity factor is further based on abilities of the plurality of network entities to modify authentication credentials of other network entities.

In some embodiments, the multi-layer evaluation produces composite scores based on combinations of the network action sensitivity factor and the network resource sensitivity factor.

The disclosed embodiments also include a computer-implemented method for automatically discovering and evaluating privileged entities in a network environment. The method can include a step of scanning the network environment to identify a plurality of network entities. The scan can further identifying network permissions corresponding to the plurality of network entities. The method can include another step of performing a multi-layer evaluation of the permissions corresponding to the plurality of network entities. This multi-layer evaluation can be based at least on factors of network action sensitivity and network resource sensitivity. The network action sensitivity factor can address the sensitivity of particular actions that the plurality of network entities are able to take in the network environment. The network resource sensitivity factor can address the sensitivity of particular resources in the network environment that the plurality of network entities are able to access.

The method can include another step of identifying a first subset of the plurality of network entities based on the multi-layer evaluation. The method can include a further step of identifying a second subset of the plurality of network entities having permissions enabling them to control attributes of the first subset of the plurality of network entities. The method can include another step of performing, based on the identifications of the first and second subsets of the plurality of network entities, at least one of: presenting at least the second subset of the plurality of network entities according to a numerical rank that corresponds to the multi-layer evaluation; outputting a report identifying at least the second subset of the plurality of network entities; and providing the identities of at least the second subset of the plurality of network entities to another system for purposes of taking actions on their permissions.

In some embodiments, the method can further include generating an alert identifying at least the second subset of the plurality of network entities. In various embodiments, the method can further include identifying recommended steps to mitigate potential security threats associated with the second subset of the plurality of network entities. In some embodiments, the method can include automatically performing mitigation steps to address potential security threats associated with the second subset of the plurality of network entities. In various aspects, the mitigation steps include disabling credentials associated with the second subset of the plurality of network entities. In some aspects, the mitigation steps include blocking network activity of the second subset of the plurality of network entities. In certain aspects, the mitigation steps include quarantining the second subset of the plurality of network entities in a sandbox environment.

In some embodiments, the method can include identifying previous network activity of the second subset of the plurality of network entities. In various embodiments, the step of scanning the network environment to identify the plurality of network entities can be performed based on a trigger of a network entity, from the plurality of network entities, being created. In some aspects, the trigger is implemented using a web hook.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Figure 1:
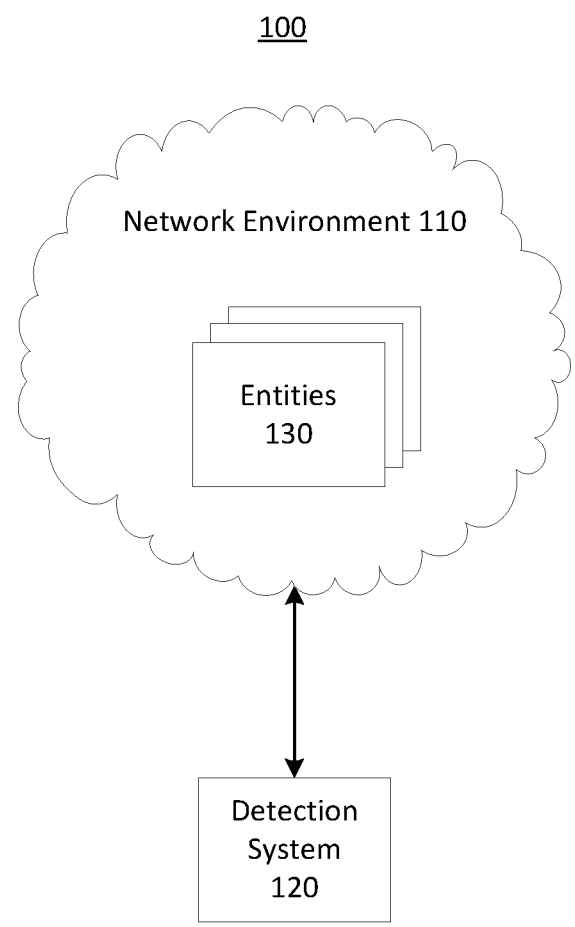
FIG. 1 depicts a schematic illustrating an exemplary system for discovering and evaluating privileged entities.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

Entities deployed to the cloud computing environment of an organization present potential vulnerabilities that an attacker may attempt to exploit. For example, these entities can be associated with permissions that enable them to take actions within the cloud computing environment. By exploiting these permissions, an attacker can obtain control over services or resources deployed to the cloud computing environment.

Practicable security may be achieved by identifying the most privileged entities that present the greatest security risks. These privileged entities should be well protected, according to best practices known in the art. For example, credentials for these privileged entities should be stored in a secure location, rotated, and monitored. The actions of these privileged entities should be tracked and reviewed for suspicious activities.

Identifying the most privileged entities in a cloud computing environment can be difficult. An organization can specify different permissions for each entity, or each type of the entity, it deploys to a cloud computing environment. Consequently, determining the set of potential permissions, and the most privileged of these potential permissions, can be difficult. Moreover, the privilege architecture (and thus the set of potential permissions) can differ between cloud services providers.

The envisioned embodiments can determine the privileged entities in the cloud computing environment of an organization. The envisioned embodiments can determine a categorization of entities based on permissions. For example, the embodiments can determine a relative ranking between two entities, identifying one entity as more privileged than another entity. While generally described with regards to cloud environments, one of skill in the art would recognize that the envisioned systems and methods could be applied to evaluating privileges for on-premises systems as well, or hybrid systems that combine cloud-based infrastructure and on-premises infrastructure (collectively referred to as "network environments"). In addition, the envisioned systems and methods could be applied in an Internet-of- Things context. In such a context, the scan and evaluation could be performed on IoT devices connected to a network, in addition to or instead of entities deployed to a cloud. A detection system could perform the scan from inside or outside the network environment (e.g., by a trusted system of another organization outside the network environment), and could perform the scan while connected to or disconnected from the network environment (e.g., by querying the network environment or evaluating the results of a query performed by another system). Furthermore, the envisioned embodiments can serve as an intrusion detection system, as detection of privileged entities could indicate an attack on the cloud computing environment of the organization. In this manner the envisioned embodiments can be used to assist detection of malicious activity.

FIG. 1 depicts an exemplary system 100 for discovering and evaluating privileged entities, consistent with disclosed embodiments. System 100 can include network environment 110 and detection system 120. Network environment 110 can be configured to host entities 130. System 100 can be configured to perform an iterative determination of entity privileges, consistent with disclosed embodiments. Based on this determination, system 100 can be configured to provide privilege information. In some aspects, system 100 can be configured to take remedial action. System 100 can be configured to discover and evaluate privileged entities automatically. For example, system 100 can discover and evaluate privileged entities without additional user interactions following configuration. As would be appreciated by one of skill in the art, the particular arrangement of components depicted in FIG. 1 is not intended to be limiting. Consistent with disclosed embodiments, system 100 can include additional components, or fewer components. For example system 100 can include additional detection system, directory servers, authentication servers, or other computing devices.

Network environment 110 can include a cloud-computing platform, consistent with disclosed embodiments. Examples of suitable cloud-computing platforms include, but are not limited to, MICROSOFT AZURE, AMAZON WEB SERVICES (AWS), GOOGLE CLOUD PLATFORM, IBM CLOUD, and similar systems. Network environment 110 can be configured to associate permissions with entities deployed to network environment 110. As a non-limiting example, when network environment 110 is AWS, network environment 110 can use AWS IDENTITY AND ACCESS MANAGEMENT (IAM) to define permissions for entities deployed to network environment 110.

Network environment 110 can be configured to maintain permissions, consistent with disclosed embodiments. These permissions can be associated with or included in entities 130. Network environment 110 can be configured to maintain these permissions as stored data and/or instructions. As a non-limiting example, the permissions can be maintained in JSON objects and/or XML documents, according to formats known to one of skill in the art. In some aspects, permissions can be assigned to an entity, for example by associating a policy defining permissions with the entity. In various aspects, a policy defining permissions can be specified, referenced, or included in the definition of the entity. In some embodiments, a cloud permission can indicate an effect (whether the policy allows or denies an action), a list of one or more actions permitted or denied by the permission, and optionally a list of one or more resources upon which one of the listed actions can be performed. For example, when the network environment is AWS, a permission associated with a role can allow the role to perform a LISTBUCKET action on an AMAZON S3 bucket. As an additional example, another permission associated with a user can allow the user to assume this role. Then the user can perform the LISTBUCKET action on the AMAZON S3 bucket. The following non-limiting example depicts an exemplary permission as implemented by AWS:

```
{"Statement":    {
   "Effect": "Allow",
   "Action": "s3:ListBucket",
   "Resource": "arn:aws:s3:::example_bucket"
}}
```

As shown, this permission allows the action "listbucket" to be performed on the AMAZON S3 bucket "example_bucket".

Detection system 120 can be configured to interact with network environment 110 to discover and/or evaluate privileged entities. In various embodiments, detection system 120 can be deployed to network environment 110, together with entities 130. In some embodiments, detection system 120 can be implemented using one or more computing devices differing from those implementing network environment 110 (as shown in FIG. 1). Detection system 120 can then be configured to retrieve information concerning the entities deployed to network environment 110 and the privileges associated with these entities. In some aspects, detection system 120 can be configured to generate a tamper-proof record of scanning results. Detection system 120 can be configured to store this record in a database and to repeatedly, intermittently, or periodically compare scan results.

In some embodiments, detection system 120 can be configured to communicate with network environment 110 using an application programming interface. This application programming interface can be exposed by network environment 110. For example, the scan of network environment 110 can be based on a query to an application programming interface associated with a cloud network provider.

In some embodiments, detection system 120 can be configured to communicate with network environment 110 over a network. This network can include one or more wired and/or wireless networks. For example, this network may include a cellular network, a public land mobile network, a local area network, a wide area network, a metropolitan area network, a fixed telephone network, an intranet, the Internet, a fiber optic-based network, a Bluetooth network, a radio network, a near field network, or any other type of electronics communications network know to one of skill in the art.

Detection system 120 can be configured to operate automatically or in response to a user command or system command (e.g., a command issued by an application, an instance of an application, an API, a system call, etc.). As an example of automatic operation, detection system 120 can be scheduled to discover and evaluate privileged entities repeatedly, intermittently, or periodically. As an additional example, detection system 120 can be configured to perform real time detection. In such instances, detection system 120 can be triggered using a web hook (e.g., a CLOUD HOOK or a SERVERLESS CLOUD FUNCTION). The web hook can trigger detection system 120 upon creation of a new cloud entity. In such aspects, upon creation of the new cloud entity, detection system 120 can be configured to evaluate the privileges of the new entity.

Entities 130 can be deployed to network environment 110, consistent with disclosed embodiments. In some embodiments, entities 130 can include identities, such as users (e.g., data and/or instructions representing a person or service account), groups (data and/or instructions representing sets of users), and roles (data and/or instructions defining permissions that can be assumed by other entities); and services or applications deployed to network environment 110. In some embodiments, when network environment 110 includes an on-premises component, an entity can be a specific machine (e.g., a specific workstation, laptop, or mobile device).

Figure 2:
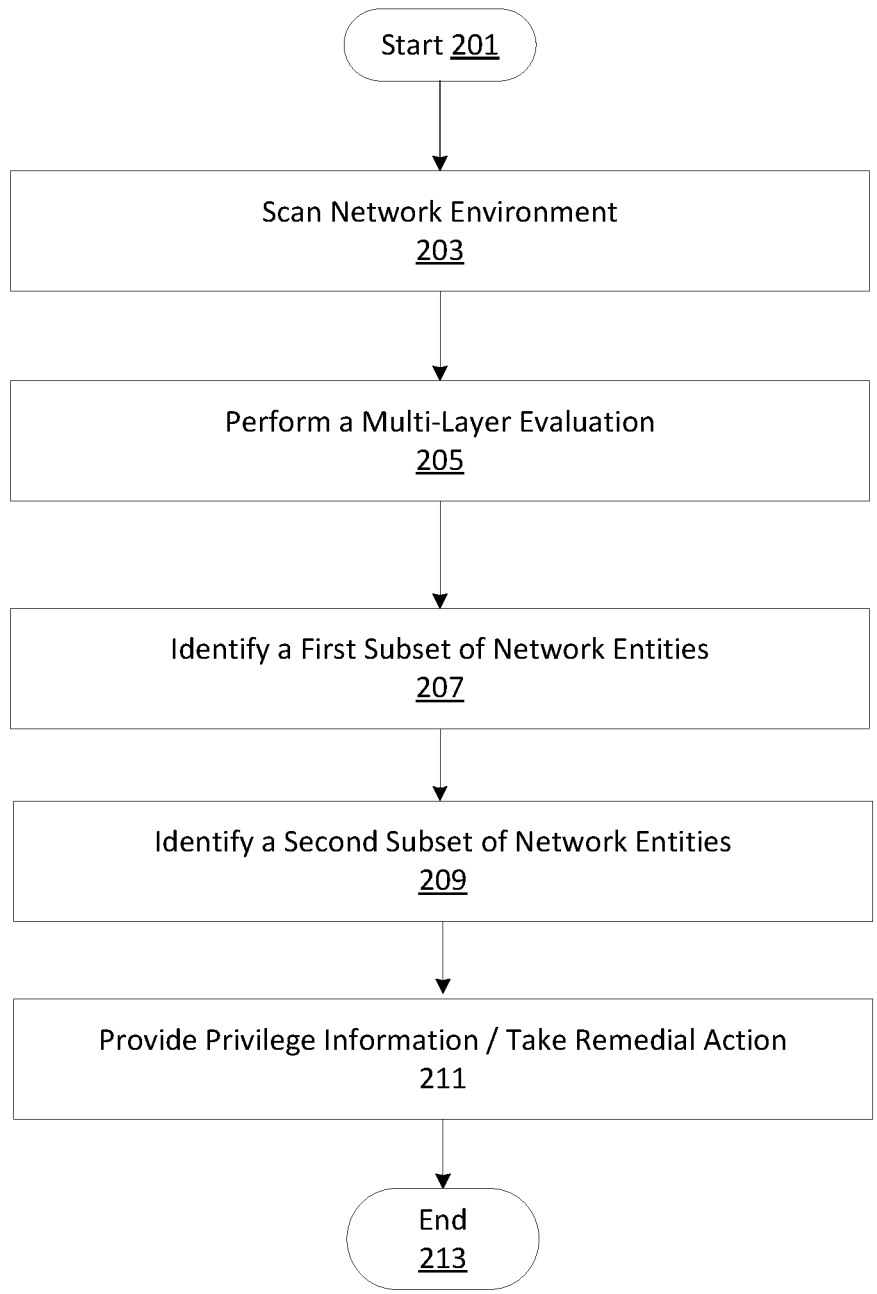
FIG. 2 depicts an exemplary method for discovering and evaluating privileged entities.

FIG. 2 depicts an exemplary method 200 for discovering and evaluating privileged entities. In some embodiments, method 200 includes the steps of scanning the network environment 203, performing a multi-layer evaluation of the identified entities 205, identifying a first subset of network entities 207, identifying a second subset of network entities 209, and providing privilege information and/or taking remedial action 211. In this manner, system 100 can perform method 200 to discover and evaluate privileged entities, consistent with disclosed embodiments. As would be appreciated by one of skill in the art, the particular order and number of steps are not intended to be limiting.

After starting in step 201, method 200 can proceed to step 203. In step 203, system 100 can actively scan network environment 110. In some embodiments, detection system 120 can scan network environment 110 to identify a plurality of network entities (e.g., entities 130). For example, detection system 120 can query to a directory service (e.g., ACTIVE DIRECTORY, or AMAZON CLOUD DIRECTORY) associated with network environment 110 for information regarding the plurality of network entities. Detection system 120 can also identify network permissions corresponding to the plurality of network entities. For example, when the directory service is AMAZON CLOUD DIRECTORY, detection system 120 can call the LOOKUPPOLICY API action on each of the identified network entities. In the case of identified network entities, this API call can return any permissions associated with the identifies network entities. As described above, in some embodiments, the step of scanning the network environment to identify the plurality of network entities can be performed based on a trigger. Such a trigger can include the creation of one of the plurality of network entities. The trigger can be implemented using a web hook, as described above.

After step 203, method 200 can proceed to step 205. In step 205, system 100 can evaluate the permissions corresponding to the detected network entities. In some embodiments, this evaluation can be multi-factorial. In some aspects, the evaluation can be based on a network action sensitivity factor. This network action sensitivity factor can address the sensitivity of particular actions that a network entity can take in a network environment 110. For example, some actions, or categories of action, can more easily expose network environment 110 to control or subversion by an attacker. For example, an entity having a permission enabling it to create additional permissions can obtain control over network environment 110, for example by elevating its own privilege level or generating additional permissions to access resources as needed. As an additional example, an entity having a permission enabling it to read from a resource, but lacking other permission, may be less likely to obtain control over network environment 110. In various aspects, the evaluation of permissions can be based on this network can be based on a network resource sensitivity. This network resource sensitivity factor can address the sensitivity of particular resources in network environment 110 that the network entity can access. For example, a datacenter resource (e.g., an S3 bucket) can have a greater sensitivity than a role associated with limited permissions.

System 100 can be configured to perform a multi-layer evaluation of the permissions, consistent with disclosed embodiments. In some aspects, evaluation of permissions can include measuring a score for the permissions. For example, system 100 can initially determine the most privileged entities (e.g., a first layer of permissions), and the subsequently repeat this determination, identifying entities able to control attributes of the most privileged entities identified in the original determination (e.g., a second layer of permissions). For example, given a user and a role, system 100 can determine in an initial evaluation that the user has the ability to assume the role. This permission may not, in itself, identify the user as a privileged entity. But system 100 can also determine in the initial evaluation that the role has a high network action sensitivity. For example, a user may be able to assume the role of an administrator. This administrator role may have a high network action sensitivity. The role can therefore be a privileged entity. In the next evaluation, the system can identify the user as having privileges over the role (e.g., as described above, the user may be able to assume the role). The user can therefore be identified as a privileged entity. In addition, other exemplary relationships could also support identification as a privileged entity. For example, a group could be a privileged entity and a user could have (otherwise limited) permissions to add itself to that group. Additional examples of entities able to control attributes of other entities, in the context of the AWS network environment, include entities associated with permissions including:

CreateAccessKey actions on administrator accounts. When an entity is associated with a permission including a CreateAccessKey action on an administrator account, an attacker can abuse this permission by using the entity to create a new access key to the administrator account. The API call returns the newly created access key, enabling the attacker to access the administrator account. For example:

```
{
  "Statement": [
    {
      "Action": ["aim:CreateAccessKey"],
      "Effect" : "Allow",
      "Resource": "arn:aws:iam::123456789012"user/AWS-AdminName"
    }
  ]
}
```

An AWS entity associated with the above permission is effectively as privileged as an AWS administrator account ("AWS-AdminName" in this example). By abusing this permission, and attacker can create and gain a new privileged access key and execute malicious actions in network environment 110.

AttachUserPolicy, AttachGroupPolicy or AttachRolePolicy actions. An attacker controlling an entity associated with a permission including these actions could attach an existing administrator policy to another AWS entity controlled by the attacker, effectively creating a new administrator account. The attacker could then use this account to execute malicious actions in network environment 110.

PutUserPolicy, PutGroupPolicy or PutRolePolicy actions. An attacker controlling an entity associated with a permission including these actions could embed permissions in other entities. These new permissions can be defined by the attacker to grant privileges sufficient to execute malicious actions in network environment 110.

CreatePolicy action. An attacker controlling an entity associated with a permission including this action could create an admin policy (e.g., calling it by a misleading name like "ReadOnly") and could attach the policy to the compromised entity, creating in effect an AWS administrator account.

UpdateLoginProfile action. An attacker controlling an entity associated with a permission including this action could use the permission to reset other IAM account login passwords to known default values. The attacker could then access these accounts using the known default password values.

CreateLoginProfile action. A privileged service entity configured for automatic usage by an application can include API access keys. An attacker controlling an entity associated with a permission including this action could add a new login password having a default value to this privileged service entity. The attacker could then access the full power of the AWS website console.

AddUserToGroup action. An attacker controlling an entity associated with a permission including this action can add the entity to the administrator group of the organization, effectively making the entity an administrator.

CreatePolicyVersion and SetDefaultPolicyVersion actions. An attacker controlling an entity associated with a permission including these actions could use the entity to change a customer-managed policy (containing permissions) on a non-privileged account to be a privileged policy.

CreateRole with PutRolePolicy/AttachRolePolicy or PassRole with CreateInstanceProfile/AddRoleToInstanceProfile action combinations. An attacker controlling an entity associated with these action combinations could create a new privileged role and grant or assume permission to this entity, or add the role to a compromised AMI instance the attacker controls.

UpdateAssumeRolePolicy. An attacker controlling an entity associated with a permission including this action could change the permissions of a privileged role and then use the entity to assume this role, effectively granting the entity administrator status.

As shown in the above examples, an entity may not be privileged directly, but may be privileged by virtue of control that entity can exercise over a privileged entity. Therefore system 100 can be configured to first determine a privileged entity and then successively determine "layers" of entities controlling that privileged account. Therefore, in some aspects, system 100 can repeat the multi-layer evaluation until a condition is satisfied. For example, system 100 can repeat this determination a predetermined number of times or until no new "layers" of privileged entities are identified.

After or as part of step 205, method 200 can perform step 207. In step 207, system 100 can identify a first subset of the plurality of network entities (e.g., a subset of entities 130). System 100 can identify this first subset based on the multi-layer evaluation. For example, system 100 can identify entities having a measured score exceeding a threshold. This threshold can be predetermined and can be received by detection system 120 from a user device or obtained by interactions with a user (e.g., though a graphical user interface). In some aspects, entities with scores above this threshold are considered privileged. Alternatively or additionally, detection system 120 can be configured to determine whether a network entity has permissions matching any permissions in this predefined set. These matching "blacklisted" permissions can be automatically labeled as privileged entities. For example, when the network environment is AWS, a network entity with permissions including those AWS actions (or combinations of actions) explicitly called out above may be automatically labeled a privileged entity.

After or as part of step 205, method 200 can perform step 209. In step 209, system 100 can identify a second subset of the network entities 209. In some aspects, as described above, system 100 can begin with the current set of privileged entities (e.g., those identified in step 207) and search for other entities having privileges over them. In this manner, system 100 can identify a second subset of the plurality of network entities (e.g., a second subset of entities 130) having permissions enabling them to control attributes of the first subset of the plurality of network entities. Because the entities in this second subset have privileges over those in the first subset, they are also privileged entities. In some embodiments, the first and second subsets of the plurality of network entities include at least some common network entities. For example, the second subset may only include entities privileged in their own right, and by virtue of the control they exercise over other privileged entities. In various embodiments, the first and second subsets of the plurality of network entities do not include any common network entities. For example, the second subset may only include entities privileged solely by virtue of the control that they exercises over one or more privileged entities. As would be recognized by one of skill in the art, the second subset may also include both entities privileged in their own right and entities privileged by virtue of control over privileged entities.

As described above, the multi-layer evaluation can be an iterative process. Therefore system 100 can search for additional entities that might have specific sensitive permissions over the entities in the second subset, and so on. Thus, for example, method 200 can include identifying a third set of network entities having permissions enabling them to control attributes of the second subset of the plurality of network entities. In some embodiments, the third set of network entities includes network entities that were not identified during the scan of the network performed in step 203.

In some embodiments, system 100 can be configured to rank the network entities. For example, system 100 can be configured to create a numerical rank that corresponds to the multi-layer evaluation. This numerical rank can be based upon the identifications of the first and second subsets of the plurality of network entities. For example, the most privileged entity, as determined by the measured score, can be assigned the lowest (or alternatively highest) rank. The least privileged entity, as determined by the measured score, can be assigned the highest (or alternatively lowest) rank.

After steps 207 and 209, method 200 can perform step 211. In step 211, system 100 can provide privilege information, consistent with disclosed embodiments. For example, system 100 can summarize and provide the results of the multi-layer evaluation. In some embodiments, detection system 120 can provide the privilege information directed to a user (e.g., through a graphical user interface of detection system 120). In various embodiments, detection system 120 can provide privilege information to another system. For example, detection system 120 can provide the privilege information to a mobile device, laptop, desktop, workstation, or server.

Providing the privilege information can include presenting information identifying at least some of the network entities, consistent with disclosed embodiments. For example, detection system 120 can output a report identifying at least the second subset of the plurality of network entities. In some aspects, detection system 120 can present these network entities according a numerical rank corresponding to the multi-layer evaluation. For example, detection system 120 can provide at least the second subset of the plurality of network entities according to numerical rank. For example, detection system 120 can provide a number of the highest ranked entities in the second subset (e.g., the most highly ranked entity, the most highly ranked 10 entities, etc.). Providing the privilege information can include identifying previous network activity of the second subset of the plurality of network entities, consistent with disclosed embodiments. Providing the privilege information can include generating an alert identifying at least the second subset of the plurality of network entities. In some embodiments, detection system 120 can identify recommended steps to mitigate potential security threats associated with the second subset of the plurality of network entities.

System 100 can take mitigating actions in step 211 of method 200, consistent with disclosed embodiments. System 100 can be configured to take these mitigating actions directly or indirectly. In some embodiments, system 100 can be configured to automatically perform mitigation steps to address potential security threats associated with network entities. For example, these mitigation steps can include disabling credentials associated with network entities. As an additional example, these mitigation steps can include blocking network activity of network entities. As a further example, these mitigation steps can include quarantining network entities in a sandbox environment. As an additional example, these mitigation steps can include restricting or modifying the permissions of network entities. As a further example, these mitigation steps can include tracking activities of privileged entities and securing privileged user sessions. In various embodiments, system 100 can automatically perform these mitigation steps for entities in the second subset of the plurality of network entities, or for entities exceeding a predetermined privilege threshold. In some embodiments, system 100 can also perform these mitigation steps in response to user requests. After step 211, method 200 can end at step 213, or can repeat any one or more of the preceding steps.

In various embodiments, as previously disclosed, system 100 can be configured to provide privilege information to another system. This other system can be configured to take actions based on the privilege information. For example, this other system can be configured to disable credentials of, block network activity of, restricting or modifying the permissions of, and/or quarantine network entities. In certain embodiments, these mitigation steps can include tracking activities of privileged entities and securing privileged user sessions. In some embodiments, the other system can automatically perform these mitigation steps for entities in the second subset of the plurality of network entities, or for entities exceeding a predetermine privilege threshold. In various embodiments, the other system can also perform these mitigation steps in response to user requests. In some embodiments, the other system can be a privileged account security system, such as a CYBERARK PRIVILEGED ACCOUNT SECURITY SOLUTION.

As described above, in some embodiments method 200 can be performed automatically and repeatedly, intermittently, or periodically (e.g., hourly, daily, weekly, or monthly). Method 200 can include comparing the privileged entities identified by the current multi-layer evaluation with records of privileged entities identified in previous multi-layer evaluations. Following detection of discrepancies (e.g., a new privileged entity or a change in measured score for an entity), system 100 can be configured to perform one or more of sending alerts, providing recommendations, or taking automatic mitigation steps, among other potential actions. In some aspects, system 100 can send an alert using a privileged account security system or a security information and event management system (e.g., via a GUI prompt). Additionally or alternatively, system 100 can send an alert using email, SMS message, push notification from mobile application, HTTP page, or similar communication channels. In various aspects, system 100 can provide recommendations regarding the new privileged entity, or entity with changed measured score. For example, system 100 can recommend that this entity be managed, monitored, have its credentials periodically rotated, and have taken other security measures taken. In some aspects, system 100 can be configured to perform automatic mitigation steps, including disabling the credentials for the entity responsible for the discrepancy (e.g., when network environment 110 is AWS, disabling the access key), or automatically on-boarding the entity responsible for the discrepancy to a privileged account security system. In various aspects, system 100 can be configured to provide a diagnostic report of the cloud environment, and of the activities of the entity responsible for the discrepancy. For example, in AWS the activities of the entity could be obtained from the AWS CloudTrail logs.

Figure 3:
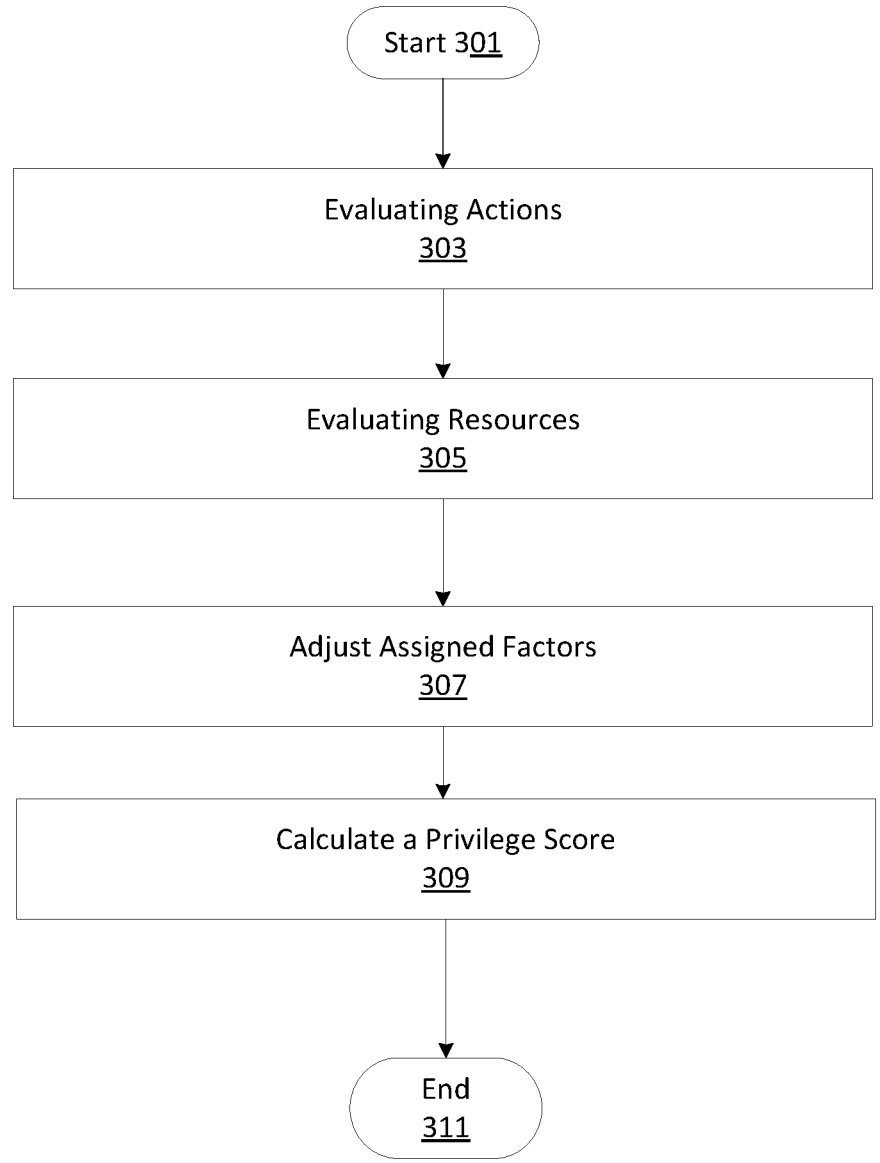
FIG. 3 depicts an exemplary method for evaluating privilege levels of an entity.

FIG. 3 depicts an exemplary method 300 for evaluating permissions of an entity, consistent with disclosed embodiments. In some embodiments, system 100 can perform method 300 as part of method 200. For example, method 300 can be performed as part of the multi-layer evaluation in step 205 of method 200. In some embodiments, method 300 can be performed on entities identified by scanning network environment 110 in step 203. Further, method 300 can also be performed independently of method 200. In some embodiments, method 300 includes the steps of evaluating actions 303, evaluating resources 305, adjusting an assessment 307, and calculating a privilege score 309. Thus the multi-layer evaluation of method 200 can calculate a privilege score for an entity based on the ability of the entity to access or control specific resources in the network. In some embodiments, the factors on which the multi-layer evaluation is based can dynamically change. For example, as permissions are attached or embedding in an entity, or as existing permissions are modified, the calculated privilege score can change.

After starting in step 301, method 300 can perform step 303. In step 303, system 100 can evaluate actions for permissions associated with an entity. As disclosed above, detection system 120 can be configured to determine a network action sensitivity factor that addresses the sensitivity of particular actions that the plurality of network entities can take in the network environment. In some aspects, the sensitivity of a particular action can depend on whether the action could enable a network entity to escalate its own permissions. In various aspects, the sensitivity of a particular action can depend on whether the action could enable a network entity to modify permissions of other network entities. In certain aspects, the sensitivity of a particular action can depend on whether the action could enable a network entity to modify authentication credentials of other network entities. For example, in some aspects, the most privileged permission enables an associated resource to perform all actions (e.g., access all application programming interfaces). In various aspects, actions that create or remove permissions can be ranked above actions that associate or disassociate existing permissions with entities. In some aspects, actions that associate or disassociate existing permissions with entities can be ranked above actions that update existing policies or upload keys and credentials without changing existing associations. In some aspects, actions that update existing policies or upload keys and credentials without changing existing associations can be ranked above actions that embed permissions into an entity. In various aspects, actions that merely involve retrieval of information can rank below actions that embed permissions into an entity.

System 100 can assign values to these categories of actions that reflect the sensitivity of these actions. These values can indicate not just a relative ranking, but also a severity. In some aspects, two actions of similar severity can be closer in value than two actions of dissimilar severity. For example, a first value for first actions that update existing policies or upload keys and credentials can be much closer to a second value for second actions that associate or disassociate existing permissions with entities than to a third value for third actions that retrieve information about entities. This variance can reflect the similar severity of the first and second action, and the dissimilar severity of the first and third actions. In some aspects, values can be expressed on a predetermined scale (e.g., a scale of one to ten). A non-limiting example of such values for actions provided by the AWS network environment are provided as follows:

The API field option of "*" gets the highest grade of 10.
"Create" API calls can be assigned a value of 9. These calls can include CreateAccessKey, CreateAccountAlias, CreateGroup, CreateInstanceProfile, CreateLoginProfile, CreateOpenIDConnectProvider, CreatePolicy, CreatePolicyVersion, CreateRole, CreateSAMLProvider, CreateServiceLinkedRole, CreateServiceSpecificCredential, CreateUser, CreateVirtualMFADevice, and other actions with similar effects.

"Delete" API calls can be assigned a value of 9. These calls can include DeleteAccessKey, DeleteAccountAlias, DeleteAccountPasswordPolicy, DeleteGroup, DeleteGroupPolicy, DeleteInstanceProfile, DeleteLoginProfile, DeleteOpenIDConnectProvider, DeletePolicy, DeletePolicyVersion, DeleteRole, DeleteRolePolicy, DeleteSAMLProvider, DeleteServerCertificate, DeleteServiceLinkedRole, DeleteServiceSpecificCredential, DeleteSigningCertificate, DeleteSSHPublicKey, DeleteUser, DeleteUserPolicy, DeleteVirtualMFADevice, and other actions with similar effects.

"Attach" API calls can be assigned a value of 8. These calls can include AttachGroupPolicy, AttachRolePolicy, AttachUserPolicy, and other actions with similar effects.

"Remove" API calls can be assigned a value of 8. These calls can include RemoveClientIDFromOpenIDConnectProvider, RemoveRoleFromInstanceProfile, RemoveUserFromGroup, and other actions with similar effects.

"Update" API calls can be assigned a value of 7. These calls can include UpdateAccessKey, UpdateAccountPasswordPolicy, UpdateAssumeRolePolicy, UpdateGroup, UpdateLoginProfile, UpdateOpenIDConnectProviderThumbprint, UpdateRoleDescription, UpdateSAMLProvider, UpdateServerCertificate, UpdateServiceSpecificCredential, UpdateSigningCertificate, UpdateSSHPublicKey, UpdateUser, and other actions with similar effects.

"Upload" API calls can be assigned a value of 7. These calls can include UploadServerCertificate, UploadSigningCertificate, UploadSSHPublicKey, and other actions with similar effects.

"Put" API calls can be assigned a value of 6. These calls can include PutGroupPolicy, PutRolePolicy, PutUserPolicy, and other actions with similar effects.

"Get" API calls can be assigned a value of 3. These calls can include GetAccessKeyLastUsed, GetAccountAuthorizationDetails, GetAccountPasswordPolicy, GetAccountSummary, GetContextKeysForCustomPolicy, GetContextKeysForPrincipalPolicy, GetCredentialReport, GetGroup, GetGroupPolicy, GetInstanceProfile, GetLoginProfile, GetOpenIDConnectProvider, GetPolicy, GetPolicyVersion, GetRole, GetRolePolicy, GetSAMLProvider, GetServerCertificate, GetServiceLinkedRoleDeletionStatus, GetSSHPublicKey, GetUser, GetUserPolicy and other actions with similar effects.

"List" API calls can be assigned a value of 2. These calls can include ListAccessKeys, ListAccountAliases, ListAttachedGroupPolicies, ListAttachedRolePolicies, ListAttachedUserPolicies, ListEntitiesForPolicy, ListGroupPolicies, ListGroups, ListGroupsForUser, ListInstanceProfiles, ListInstanceProfilesForRole, ListMFADevices, ListOpenIDConnectProviders, ListPolicies, ListPolicyVersions, ListRolePolicies, ListRoles, ListSAMLProviders, ListServerCertificates, ListServiceSpecificCredentials, ListSigningCertificates, ListSSHPublicKeys, ListUserPolicies, ListUsers, ListVirtualMFADevices, and other actions with similar effects. Certain "read" APIs can be assigned a value of 1.

Of course, the above mapping of values to API actions is exemplary and not intended to be limiting. Different values for each of the above actions may be implemented, and additional or fewer actions may be included.

After starting in step 301, method 300 can perform step 305. In step 305, system 100 can evaluate resources for permissions associated with an entity. In some embodiments, detection system 120 can be configured to determine a network resource sensitivity factor that addresses the sensitivity of particular resources in the network environment that the plurality of network entities are able to access. In certain aspects, the network resource sensitivity factor can be based upon a number of network resources that a network entity can access or control. Similar to the network action sensitivity factor, detection system 120 can assign a value to the network resource sensitivity factor. This value can be selected from a predetermined range (e.g., one to ten). In some embodiments, this value can represent a percentage of the resources in the network environment that are affected. As a non-limiting example, when 50% of the available resources are affected, detection system 120 can assign a value of 5 as the network resource sensitivity factor for the permission. When the permission policy targets all the available resources (e.g., when the network environment is AWS, a permission using a "*" wildcard to indicate the acceptable resources), detection system 120 can assign a value of 10 for the permission.

After steps 303 and 305, method 300 can perform step 307. In step 307, system 100 can adjust the network resource sensitivity factor. In some aspects, this adjustment can reflect the potential for particular combinations of actions and resources to result in a greater security risk. In some embodiments, detection system 120 can be configured with a predetermined set of high-risk permissions and associated network resource sensitivity values.

In various aspects, an individual or organization that deployed the entities to network environment can define a set of sensitive resources. Detection system 120 can increase the network resource sensitivity for permissions affecting these sensitive resources. For example, detection system 120 can adjust a network resource sensitivity factor for a permission affecting a datacenter machine to a value of 10, to reflect the potential of improper access to customer data. As an additional example, detection system 120 can adjust a network resource sensitivity factor for a permission affecting an important DevOps service to a value of 10. Likewise, detection system 120 can be configured to reduce scores for permissions concerning a set of less-sensitive resources. Detection system 120 can decrease the values for the network resource sensitivity factor for permissions affecting these less-sensitive resources.

After step 307, method 300 can perform step 309. In step 309, system 100 can calculate a privilege score for an entity. In some embodiments, the privilege score can be a composite score based on a combination of a network action sensitivity factor and a network resource sensitivity factor. For example, the privilege score can be based on the network resource sensitivity factor and the network action sensitivity factor for at least one permission associated with the entity (e.g., a permission attached to the entity or embedded in the entity). In some aspects, the privilege score can be a function of the network resource sensitivity factor and the network action sensitivity factor. For example, the privilege score can be the product of the network resource sensitivity factor and the adjusted network resource sensitivity factor. When multiple permissions are associated with an entity, an overall privilege score can be a function of privilege scores for each of these permissions. For example, the overall privilege score can be the maximum, minimum, or average of the privilege scores for these permissions. In this manner, method 300 can generate a privilege score for each entities detected in the scan. After step 309, method 300 can end at step 311.

EXAMPLES

The following examples disclose how the envisioned systems and methods can be used in an exemplary environment to improve computer security.

As a first example, an organization develops a plan to protect privileged entities deployed to network environment 110. The envisioned multi-layer scan can enable the staff of the organization to identify the most privileged entities deployed to network environment 110. In some aspects, the envisioned embodiments can produce a list of these privileged entities. The staff of the organization can now focus particular attention on ensuring the security of these entities. For example, they may delegate management of the security for these entities to a Privileged Account Security (PAS) System, as described above.

As a second example, a computer system for an organization can be configured to perform the envisioned multi-layer scan once a day. When the scan discovers new privileged entities deployed to network environment 110, detection system 120 can send an alert to the organization's security team. The security team can determine that a new privileged entity is controlled by an attacker that comprised network environment 110 and was attempting to assign more sensitive privileges to the new privileged (and compromised) entity. Because of the multi-layer scan, this attack was exposed and halted.

As a third example, an organization can have a vast number of different cloud entities. The staff of the organization may attempt to manually determine privileged entities. But they may inadvertently miss certain privileged entities. While the known privileged entities are secured, an attacker able to comprise network environment 110 may locate the remaining unidentified privileged entities. Because these unidentified privileged entities are not secured with rotating passwords, an attacker can use a brute force attack to access them, gaining full control over all the entities deployed by the organization to network environment 110. In contrast, when the organization uses the envisioned systems and methods described above, the privileged entities can be automatically detected. In some embodiments, the privileged entities can be automatically added to a Privileged Account Security (PAS) System. This PAS system can be configured to automatically rotate passwords, defeating the attack described in this scenario.

Figure 4:
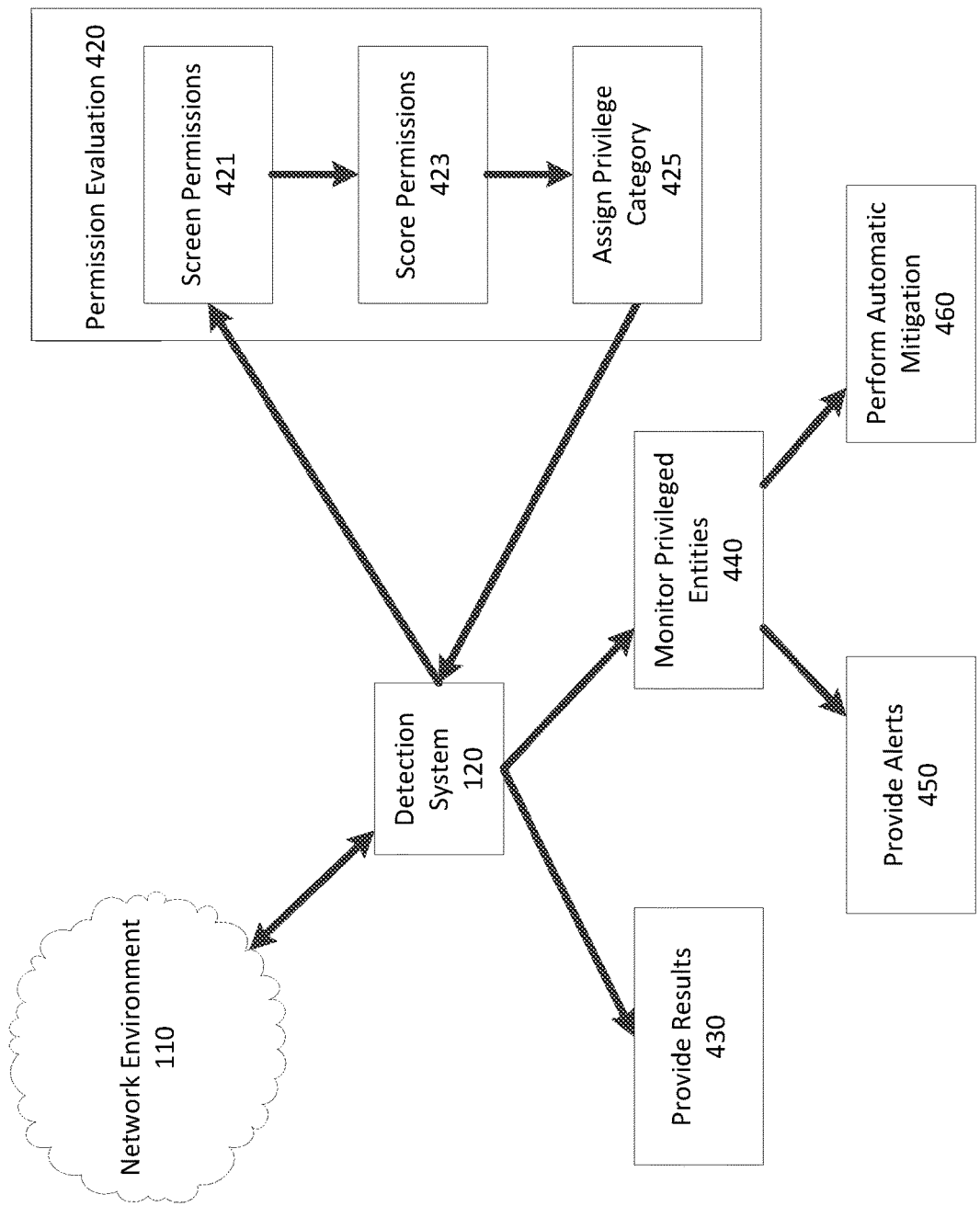
FIG. 4 depicts exemplary use cases of the envisioned systems and methods.

FIG. 4 depicts exemplary use cases of the envisioned systems and methods. As shown in FIG. 4, detection system 120 can scan network environment 110 for existing devices or entities. In some embodiments, detection system 120 can perform a method of permission evaluation (permission evaluation 420) for each of the identified devices or entities. In step 421 of this method, detection system 420 can screen permissions for an entity or device against a predetermined "blacklist" of permissions or permission combinations. Should the entity or device have one or more permissions on the "blacklist," detection system 120 can identify the entity or device as privileged. In some embodiments, if none of the permissions of the entity or device are on the "blacklist" then detection system 120 can score permissions in step 423. In some embodiments, scoring permissions can be performed according to the method disclosed above with regards to FIG. 3. In step 425, detection system 120 can assign a privilege category to the entity or device. This assignment can depend on a privilege score calculated for the entity in state 423. This assignment can also depend on a predetermined privilege score threshold. Detection system 120 can identify entities or devices having privileges over entities or devices categorized as privileged. In some embodiments, detection system 120 perform this additional layer of privilege detection after each of the identified entities or devices has been assigned a privilege category (e.g., privileged or not privileged). In various embodiments, detection system 120 can perform this additional layer of processing after each assignment of a privilege category to an entity or device. Detection system 120 can provide the results of the scan in step 430. Detection system 120 can be configured to monitor privileged entities in step 440. For example, detection system 120 can be configured to identify substantial changes in privileged entities. In response to such changes, detection system 120 can be configured to provide alerts 450 or perform automatic mitigation 460.

In an exemplary use case, network environment 110 comprises a cloud computing system. Detection system 120 can query an "Identity and Access Management" service (IAM Service) of the cloud computing system for the permission of the cloud entity "cloud_user1". The IAM service can indicate to detection system 120 that "cloud_user1" has a "deleteFile" permission that may be exercised on all target resources of an organization on the cloud computing system. Detection system 120 can perform permission evaluation 420 for the "deleteFile" permission. In step 421, detection system 120 can determine that "deleteFile" is not on the permission "blacklist". In step 423, detection system 120 can determine that "deleteFile" has a high action sensitivity factor of 9, and a high resource sensitivity factor of 10 (as the "deleteFile" permission can be performed on all resources of the organization on the cloud computing system). In some embodiments, detection system 120 can automatically adjust the resource sensitivity factor based on special sensitivity rules. For example, the cloud resource "CreditCardDB.prod.com" could be a sensitive cloud asset that stores all the company's customer's credit card information. In some aspects, detection system 120 can increase the resource sensitivity factor of the "deleteFile" permission because "cloud_user1" can perform the "deleteFile" action on the cloud resource "CreditCardDB.prod.com". Detection system 120 can then calculate an overall privilege score of cloud entity "cloud_user1" based on the action sensitivity factor and the adjusted resource sensitivity factor. In various aspects, detection system 120 can calculate the overall privilege score of cloud entity "cloud_user1" based on the action sensitivity factor and the resource sensitivity factor, and then increase the overall privilege score based on the special sensitivity rules. For example, detection system 120 can increase the overall privilege score of cloud entity "cloud_user1" because "cloud_user1" can perform the "deleteFile" action on the cloud resource "CreditCardDB.prod.com". As a purely hypothetical example, detection system 120 can assign the privilege score of 78 to "cloud_user1". In step 425, detection system 120 can assign a privilege category to "cloud_user1". In this example, detection system 120 can determine that the overall privilege score of "cloud_user1" exceeds a predefined threshold of 60 and categorize "cloud_user1" as a privileged entity.

Detection system 120 can query the IAM Service of the cloud computing system for additional entities having permissions over "cloud_user1". Additionally or alternatively, detection system 120 also review previously received entity permissions to identify entities having permissions over "cloud_user1". In this example, "cloud_user2" may have a single "resetAccessKey" permission allowed only over "cloud_user1." Detection system 120 may not have initially identified "cloud_user2" as a privileged entity because of this limited permission. But in this example, "cloud_user2" can reset and create new credentials for the "cloud_user1" entity. Thus "cloud_user2" could impersonate and act as "cloud_user1." Detection system 120 can therefore assign to "cloud_user2" a privilege score of 78 (the privilege score of "cloud_user1"). Detection system 120 can also categorize "cloud_user2" as a privileged entity.

Detection system 120 can query the IAM Service of the cloud computing system for additional entities having permissions over "cloud_user2". Additionally or alternatively, detection system 120 also review previously received entity permissions to identify entities having permissions over "cloud_user2". But this third layer of scanning may not identify any entity having permissions over "cloud_user2". Detection system 120 can therefore end the scan and provide results 430 identifying "cloud_user1" and "cloud_user2" as privileged entities. In some embodiments, detection system 120 can monitor the usage of "cloud_user1" and "cloud_user2" and identify changes to these entities (monitor privileged entities 440) and provide alerts 450 and/or take automatic mitigation actions 460 according to predetermined rules.

In an exemplary use case, detection system 120 can query a "smart cards" database server in the on-premises network of an organization for smart cards permissions. In response, the database service can provide permissions for smart cards registered to the database. In this example, "smart_card1" can have a permission enabling it to approve actions on the domain controller server of the on-premises network. Such a permission could enable "smart_card1" to provide multi-factor authentication for actions taken on the domain controller of the on-premises network. Detection system 120 can perform permission evaluation 420 for the "smart_card1" permission. In step 421, detection system 120 can determine that "smart_card1" is not on the permission blacklist. In step 423, detection system 120 can determine that "smart_card1" can authorize any action on the domain controller server and therefore can assign an high action sensitivity factor of 10. Because, in this example, the on-premises network includes many additional servers, detection system 120 can assign a low resource sensitivity factor (e.g., 0.05 when the domain controller server is one of twenty servers comprising the on-premises network).

In some embodiments, detection system 120 can automatically adjust the resource sensitivity factor based on special sensitivity rules. For example, given the importance of the domain controller server, detection system 120 can be configured with a rule that increases the resource sensitivity factor of the multi-factor authentication action because "smart_card1" can perform this action on the domain controller server. Detection system 120 can then calculate an overall privilege score of "smart_card1" based on the action sensitivity factor and the adjusted resource sensitivity factor. In various aspects, detection system 120 can calculate the overall privilege score of "smart_card1" based on the action sensitivity factor and the resource sensitivity factor, and then increase the overall privilege score based on the special sensitivity rules. For example, detection system 120 can increase the overall privilege score of "smart_card1" because "smart_card1" can perform multi-factor authentication for the domain controller server. As a purely hypothetical example, detection system 120 can assign the privilege score of 94 to "smart_card1". In step 425, detection system 120 can assign a privilege category to "smart_card1". In this example, detection system 120 can determine that the overall privilege score of "smart_card1" exceeds a predefined threshold of 70 and categorize "smart_card1" as privileged (e.g, as embodying privileged entity credentials in the context of the on-premises network).

Detection system 120 can query the "smart cards" database server for additional smart cards having permissions over "smart_card1". Additionally or alternatively, detection system 120 can also review previously received smart card permissions to identify smart cards having permissions over "smart_card1". In this example, "smart_card2" may enable a user to reset a credential code of "smart_card1". But in this example, detection system 120 may have previously calculated a score of 97 for "smart_card2", and categorized "smart_card2" as privileged. As the previously calculated score for "smart_card2" is higher than the score for "smart_card1", detection system 120 does not change the score for "smart_card2". Detection system 120 can therefore end the scan and provide results 430 identifying "smart_card1" and "smart_card2" as privileged entities. In some embodiments, detection system 120 can monitor the usage of "smart_card1" and "smart_card2" and identify changes to these entities (monitor privileged entities 440) and provide alerts 450 and/or take automatic mitigation actions 460 according to predetermined rules.

In the prior exemplary use case, detection system 120 determined in step 421 that the multi-factor authentication permission of "smart_card1" was not included in the permission blacklist. But in another exemplary use case, "smart_card1" might be associated with a permission included in the permission blacklist. Such a permission, for example, could enable performance of a "resetCode" action on all the other smart cards, allowing a smart card to impersonate other existing smart cards used by the on-premises network. As an additional example, such a permission could enable creation of new smart card with full privileges in the on-premises network. Consequently, detection system 120 may therefore determine in step 421 that "smart_card1" has a permission included in the permission blacklist. Detection system 120 may therefore assign a predetermined overall privilege score to "smart_card1". This predetermined overall privilege score may range from a minimum overall privilege score sufficient to categorize "smart_card1" as privileged (e.g., a score equal to a predefined threshold for categorizing smart cards as privileged) to a maximum overall privilege score consistent with the scoring system used by detection system 120.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed:

1. A non-transitory computer readable medium including instructions that, when executed by at least one processor, cause the at least one processor to perform operations for automatically discovering and evaluating privileged entities in a network environment, the operations comprising:
    scan the network environment to identify a plurality of network entities, the scan further identifying network permissions corresponding to the plurality of network entities;
    perform a multi-layer evaluation of the permissions corresponding to the plurality of network entities, the multi-layer evaluation being based at least on factors of network action sensitivity and network resource sensitivity, wherein the network action sensitivity factor addresses the sensitivity of particular actions that the plurality of network entities are able to take in the network environment and the network resource sensitivity factor addresses the sensitivity of particular resources in the network environment that the plurality of network entities are able to access;
    identify a first subset of the plurality of network entities based on the multi-layer evaluation;
    identify a second subset of the plurality of network entities having permissions enabling them to control attributes of the first subset of the plurality of network entities; and
    perform, based on the identifications of the first and second subsets of the plurality of network entities, at least one of:
        present at least the second subset of the plurality of network entities according to a numerical rank that corresponds to the multi-layer evaluation;
        output a report identifying at least the second subset of the plurality of network entities; and
        provide the identities of at least the second subset of the plurality of network entities to another system for purposes of taking actions on their permissions.

2. The non-transitory computer readable medium of claim 1, wherein the first and second subsets of the plurality of network entities include at least some common network entities.

3. The non-transitory computer readable medium of claim 1, wherein the first and second subsets of the plurality of network entities do not include any common network entities.

4. The non-transitory computer readable medium of claim 1, wherein the multi-layer evaluation is an iterative process.

5. The non-transitory computer readable medium of claim 4, wherein the iterative process includes an operation to identify a third set of network entities having permissions enabling them to control attributes of the second subset of the plurality of network entities.

6. The non-transitory computer readable medium of claim 5, wherein the third set of network entities includes network entities that were not identified in the scan of the network.

7. The non-transitory computer readable medium of claim 1, wherein the factors on which the multi-layer evaluation is based are dynamically changing.

8. The non-transitory computer readable medium of claim 1, wherein the scan of the network environment is based on a query to an application programming interface associated with a cloud network provider.

9. The non-transitory computer readable medium of claim 1, wherein the scan of the network environment is based on a query to a directory service associated with the network environment.

10. The non-transitory computer readable medium of claim 1, wherein the operations further comprise determine whether any of the plurality of network entities have permissions matching a predefined set of known permissions.

11. The non-transitory computer readable medium of claim 1, wherein the multi-layer evaluation is based on abilities of the plurality of network entities to access or control specific application programming interfaces in the network environment.

12. The non-transitory computer readable medium of claim 1, wherein the network resource sensitivity factor is further based on numbers of network resources that the plurality of network entities are able to access or control.

13. The non-transitory computer readable medium of claim 1, wherein the network action sensitivity factor is further based on abilities of the plurality of network entities to escalate their own permissions.

14. The non-transitory computer readable medium of claim 1, wherein the network action sensitivity factor is further based on abilities of the plurality of network entities to modify permissions of other network entities.

15. The non-transitory computer readable medium of claim 1, wherein the network action sensitivity factor is further based on abilities of the plurality of network entities to modify authentication credentials of other network entities.

16. The non-transitory computer readable medium of claim 1, wherein the multi-layer evaluation produces composite scores based on combinations of the network action sensitivity factor and the network resource sensitivity factor.

17. A computer-implemented method for automatically discovering and evaluating privileged entities in a network environment, the method comprising:
   scanning the network environment to identify a plurality of network entities, the scan further identifying network permissions corresponding to the plurality of network entities;
   performing a multi-layer evaluation of the permissions corresponding to the plurality of network entities, the multi-layer evaluation being based at least on factors of network action sensitivity and network resource sensitivity, wherein the network action sensitivity factor addresses the sensitivity of particular actions that the plurality of network entities are able to take in the network environment and the network resource sensitivity factor addresses the sensitivity of particular resources in the network environment that the plurality of network entities are able to access;
   identifying a first subset of the plurality of network entities based on the multi-layer evaluation;
   identifying a second subset of the plurality of network entities having permissions enabling them to control attributes of the first subset of the plurality of network entities; and
   performing, based on the identifications of the first and second subsets of the plurality of network entities, at least one of:
      presenting at least the second subset of the plurality of network entities according to a numerical rank that corresponds to the multi-layer evaluation;
      outputting a report identifying at least the second subset of the plurality of network entities; and
      providing the identities of at least the second subset of the plurality of network entities to another system for purposes of taking actions on their permissions.

18. The computer-implemented method of claim 17, further comprising generating an alert identifying at least the second subset of the plurality of network entities.

19. The computer-implemented method of claim 17, further comprising identifying recommended steps to mitigate potential security threats associated with the second subset of the plurality of network entities.

20. The computer-implemented method of claim 17, further comprising automatically performing mitigation steps to address potential security threats associated with the second subset of the plurality of network entities.

21. The computer-implemented method of claim 20, wherein the mitigation steps include disabling credentials associated with the second subset of the plurality of network entities.

22. The computer-implemented method of claim 20, wherein the mitigation steps include blocking network activity of the second subset of the plurality of network entities.

23. The computer-implemented method of claim 20, wherein the mitigation steps include quarantining the second subset of the plurality of network entities in a sandbox environment.

24. The computer-implemented method of claim 17, further comprising identifying previous network activity of the second subset of the plurality of network entities.

25. The computer-implemented method of claim 17, wherein the step of scanning the network environment to identify the plurality of network entities is performed based on a trigger of a network entity, from the plurality of network entities, being created.

26. The computer-implemented method of claim 25, wherein the trigger is implemented using a web hook.

\* \* \* \* \*